Aug. 11, 1931.  G. M. CLASS  1,818,305
COLLET CHUCK
Filed Dec. 16, 1929  2 Sheets-Sheet 1

Inventor:
George M. Class,
By Fisher, Clapp, Soans & Pond, Attys.

Aug. 11, 1931.  G. M. CLASS  1,818,305
COLLET CHUCK
Filed Dec. 16, 1929  2 Sheets-Sheet 2
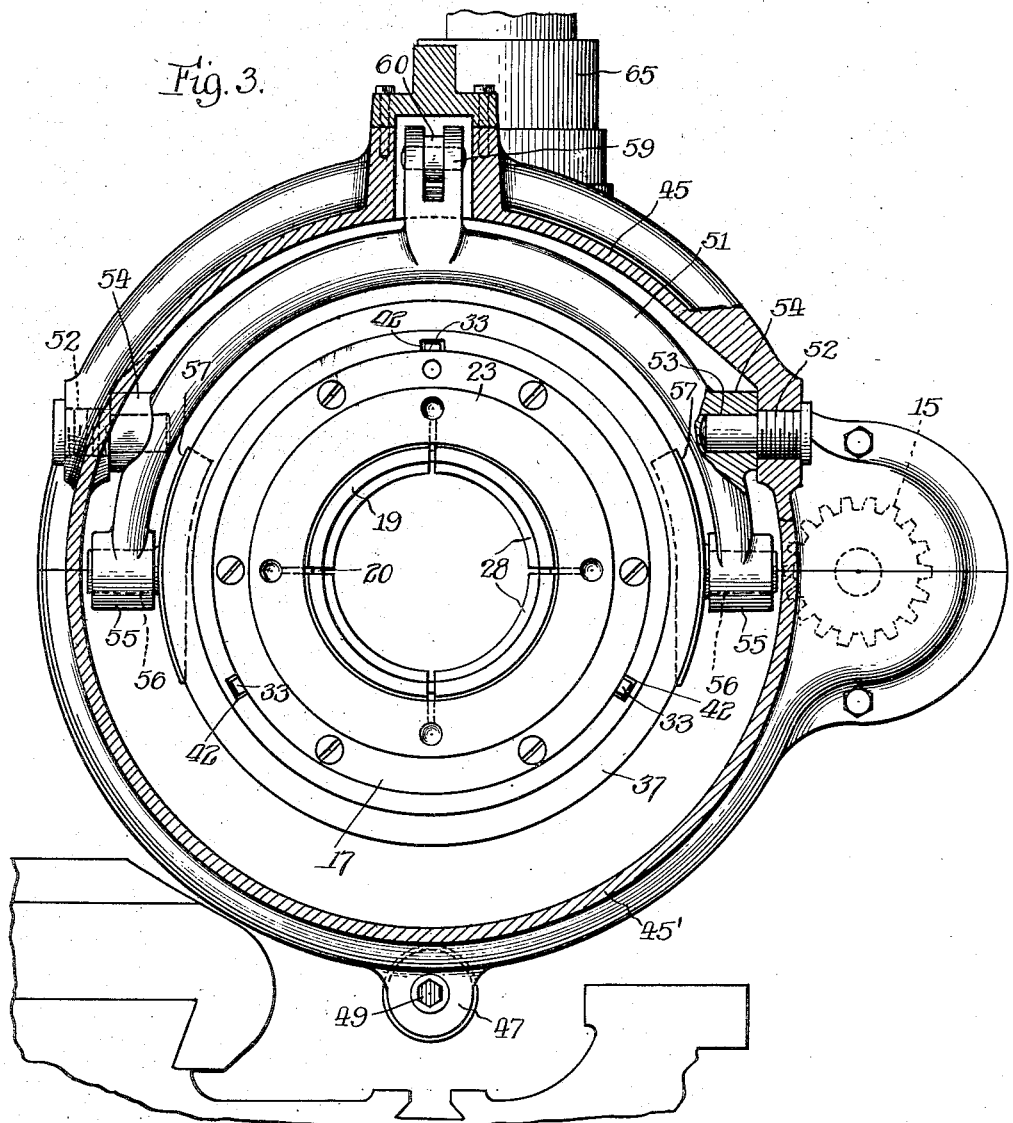
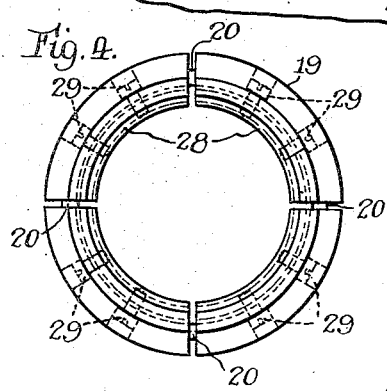
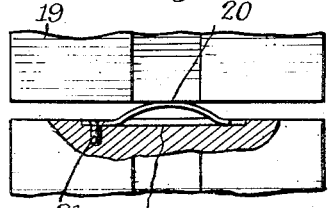
Inventor:
George M. Class
By Fisher, Clapp, Soans & Pond, Attys.

Patented Aug. 11, 1931

1,818,305

UNITED STATES PATENT OFFICE

GEORGE M. CLASS, OF MADISON, WISCONSIN, ASSIGNOR TO GISHOLT MACHINE COMPANY, OF MADISON, WISCONSIN, A CORPORATION OF WISCONSIN

COLLET CHUCK

Application filed December 16, 1929. Serial No. 414,263.

This invention relates to collet chucks, and has reference more particularly to a chuck for use on turret lathes in which turning operations are to be performed on bar stock. The chuck is of the split collet type, in which the collet is compressed to grip the work by means of a sliding collet closing ring with a taper bore fitting a correspondingly tapered surface on the collet, the sliding ring being given an endwise movement by means of a hand lever.

One common method for giving the proper sliding movement to the collet closing ring is by the use of a push tube extending through the hollow spindle and surrounding the work, the same being connected to a lever at the rear end of the lathe spindle. Another method is to operate the collet closing ring by a lever attached to the front end of the headstock. The latter method is employed in connection with the device of the present invention.

In the usual collet chuck of this class the gripping of the work is accomplished directly by the movement of the lever and is a positive operation, while the ungripping is not a positive operation, the automatic expanding tendency of the collet being relied upon to release the work. This is unreliable, because the friction between the tapered surfaces of the collet and the collet closing ring may be so excessive as to overcome the automatic expanding tendency of the collet, and thus create difficulty in unchucking the work. The main feature of the present invention resides in an improved means for positively actuating the collet closing ring in both directions, whereby both the chucking and unchucking operations are manually performed.

One simple and practical embodiment of the invention is illustrated in the accompanying drawings, in which—

Fig. 3 is a vertical transverse section taken on the line 3—3 of Fig. 1.

Fig. 4 is a detail front elevation of the split collet.

Fig. 5 is a fragmentary view of a portion of the split collet, showing in side elevation one of the collet expanding springs.

Figure 1:
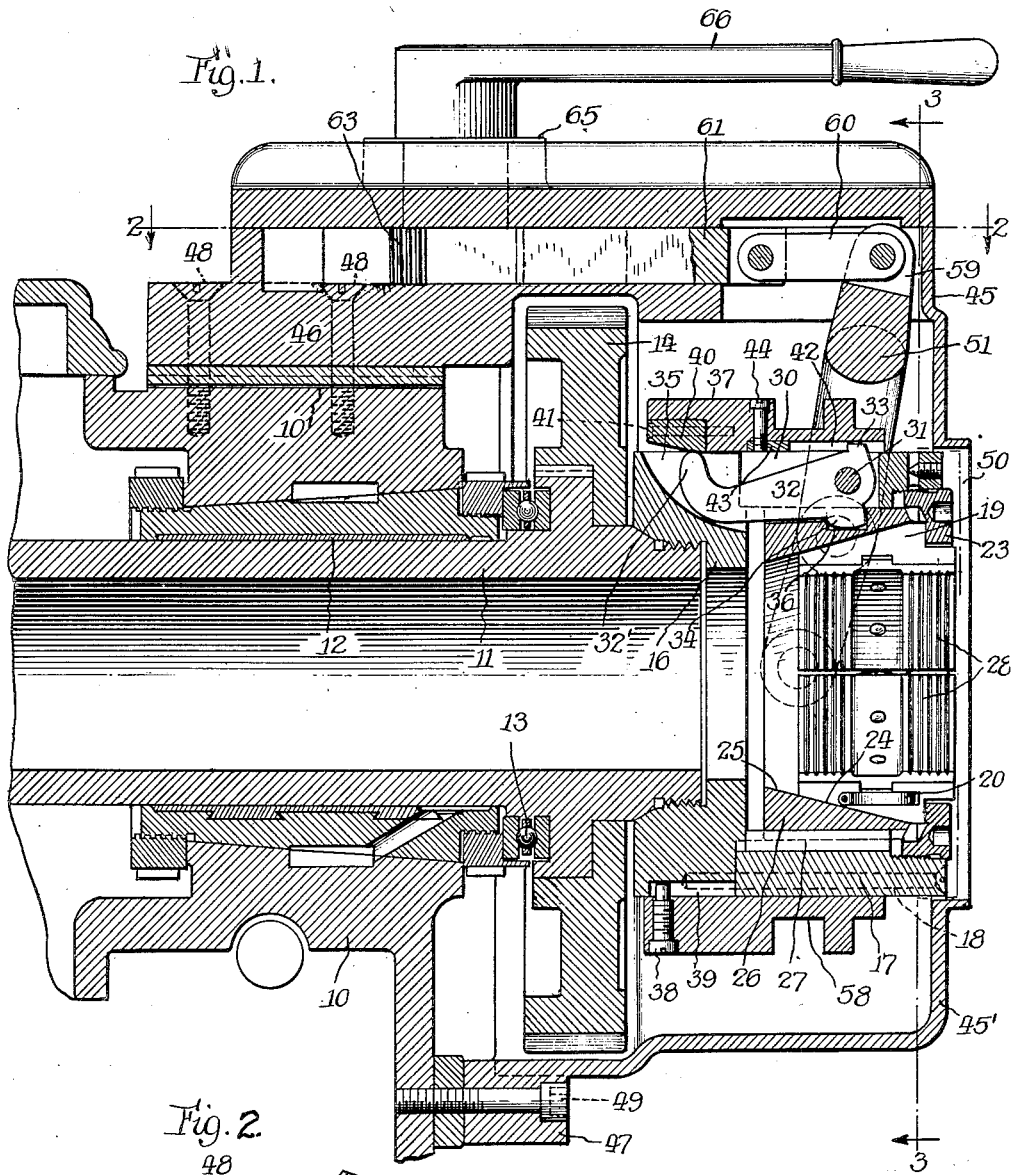
Fig. 1 is a vertical axial section through the front portion of the headstock and spindle, front spindle bearing, chuck, chuck housing and my improved chuck closing and opening mechanism.

Referring to the drawings, 10 designates a front end portion of the headstock, and 11 the front end portion of the hollow spindle, 12 the front spindle bearing and 13 the usual anti-friction end thrust bearing. In the construction shown, the spindle is driven by a gear 14 keyed on its forward end, said gear being driven by a pinion 15 (Fig. 3).

Describing the chuck, 16 designates a back plate which is screwed onto the forward end of the spindle 11 as clearly shown in Fig. 1, and 17 designates a body member which is united to the back plate 16 by a group of long screws 18, one of which is shown in dotted lines in Fig. 1. 19 designates as an entirety the split collet consisting, in the instance shown, of four quadrant segments between the meeting ends of which are inserted leaf springs 20, each spring, as shown in Fig. 5, being secured by a screw 21 in a shallow depression 22 in the end of one segment and exerting a thrust on the opposed end of the adjacent segment, whereby the four springs normally tend to expand the collet. The collet is held from moving outwardly by an adjusting ring 23 which, as shown in Fig. 1, is screwed into the outer tapped end of the body member 17. The split collet 19 is formed with an outer cylindrical surface which is tapered, as shown at 24 in Fig. 1 to fit the tapered bore 25 of a collet closing ring 26 that is slidably fitted in the bore of the chuck body member 17. The ring 26 is prevented from turning in the bore by a key 27 fitted into registering grooves in the body member 17 and the ring 26.

In order to adapt the collet for gripping different diameters of bar stock, a ring 28 to fit the bore of the collet ring 19 is provided, this ring 28 being cut into four segments corresponding with the collet segments. These ring segments 28 are known as collet pads, and they are secured in place on the collet by screws 29 (see Fig. 4).

Three longitudinal slots 30 are milled 120° apart in the body member 17, and in these slots are mounted on pivot pins 31 a corresponding group of levers each formed with a comparatively long rearwardly extending arm 32 terminating in an outwardly turned finger 32', a short outwardly extending arm 33, and a short inwardly extending arm 34. Three slots 35 are milled in the outer face of the back plate 16, these slots 35 registering with the slots 30, and accommodating the fingers 32' of the arms 32. The inwardly directed arms 34 of these levers engage grooves 36 milled crosswise in the outer surface of the collet closing ring 26. From an inspection of Fig. 1 it will be plain that an inward movement imparted to the lever arms 32 will impart to the collet closing ring 26 an outward or collet-clamping movement in an axial direction.

The outer diameters of the back plate member 16 and the body member 17 are made equal, so that a continuous cylindrical surface is formed on which is slidably fitted a ring 37, hereinafter referred to as a slider. This slider is prevented from turning on the body member 17 by a pilot screw 38, the inner end of which slidably fits a longitudinal groove 39 in the outer periphery of the back plate 16.

Three slots are milled in the rear portion of the inner periphery of the slider 37, and in these slots are fitted hardened steel wedge blocks 40 secured in place by screws 41. These wedge blocks 40 are in radial alignment with the slots 35 and 30, and the cam or wedge faces of the blocks are adapted to engage the fingers 32' of the lever arms 32, as clearly shown in Fig. 1, from which it will be seen that a sliding movement inwardly, or to the left, given to the slider 37 will impart an inward radial movement to the lever arms 32, and in turn will impart a longitudinal outward or gripping movement to the collet closing ring 26 through engagement of the lever arms 34 with the grooves 36 therein.

Three longitudinal slots 42 in the inner periphery of the outer portion of the slider 37 form clearance spaces for the short outwardly extending arms 33 of the collet ring actuating levers. Knockout blocks 43 are secured by screws 44 in the inner ends of these grooves 42; the position of the knockout blocks in the grooves being such that toward the end of the outward sliding movement of the slider 37 they will strike the lever arms 33 after the blocks 40 have cleared the fingers 32' on lever arms 32. Continued outward movement of the slider 37 will then cause the levers to turn in a clockwise direction viewing Fig. 1, and, through lever arms 34, positively move the collet clamping ring 26 inwardly or rearwardly to ungripping position, thus leaving the collet expanding springs 20 free to act and expand the collet and thus release the work held in the latter.

The chuck mechanism thus far described is surrounded by a housing unit comprising generally upper and lower sections 45 and 45'. The complete housing unit is attached to the lathe headstock by means of a pad 46 on the upper section and a lug 47 on the lower section. The pad 46 is fitted to a horizontal surface 10' planed on the headstock just above the main bearing 12, and is held in place thereon by means of screws 48; and the lug 47 is attached to the vertical face of the headstock frame by one or more screws 49. In the front of the housing is a circular opening 50 concentric with the chuck to permit application and removal of the work.

Figure 2:
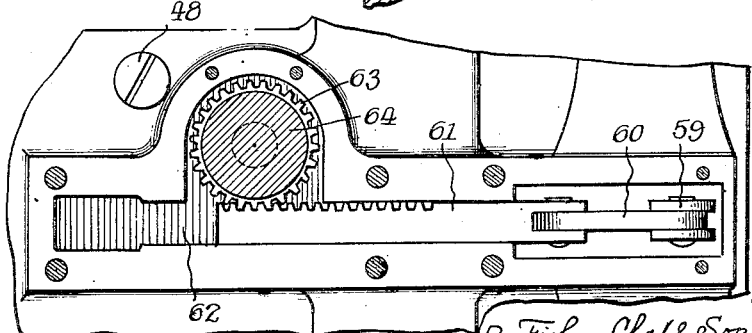
Fig. 2 is a plan section, taken on the line 2—2 of Fig. 1.

Sliding movement is given to the slider 37 by means of a forked lever 51, best shown in Fig. 3. The forked arms of this lever are fulcrumed on a pair of studs 52 secured in two holes in horizontal alignment in the upper housing member 45. The inner ends of these studs enter holes 53 in bosses 54 on the forked lever 51. The lower ends of the forked arms of the lever are formed with bosses 55 that are bored to form bearings for the trunnion portions 56 of two segmental shoes 57 which slidably fit an annular groove 58 (Fig. 1) in the slider 37. Extending upwardly from the forked arms of lever 51 is a forked stem or lug 59 that is connected by a link 60 (Figs. 1 and 2) to the outer end of a rack bar 61 mounted to slide in a suitable guideway 62 in the upper section 45 of the housing. Rack bar 61 is engaged by a pinion 63 fast on the lower end of a vertical shaft 64 journaled in a bearing boss 65 in the housing member 45; and keyed on the upper end of shaft 64 is a horizontal hand lever 66.

Referring to Fig. 1, the parts are therein shown in a collet-clamping or gripping position, wherein the hand lever 66 has been turned to force the rack bar 61 and link 60 outwardly or to the right, thereby, through the lever 51, forcing slider 37 inwardly or to the left. This has caused the wedge blocks 40 to cam the collet-clamping levers in a direction to advance the collet clamping ring 26 over the tapered surface of the collet, first moving the latter into contact with the stop ring 23 and then gripping the collet on the work. When the work is to be removed from the chuck, the hand lever 66 is swung in the opposite direction to shift the rack bar 61 and link 60 inwardly or to the left and this shifts the slider 37 outwardly or to the right. During the first part of this movement of the slider, the wedge blocks 40 pass off the fingers 32' of the collet clamping levers, relieving the lever arms 32 of pressure. Continued movement of the slider 37 in the same direction brings the knockout blocks 43 into engagement with the arms 33 of the collet-clamping levers, swinging the latter in a clockwise direction and thus positively retracting the collet-clamping ring 26 from the collet, so that the latter is then free to expand under the thrust of its springs 20, releasing the work.

From the foregoing it will be seen that the device of the present invention provides a means for positively actuating the collet-clamping ring in both directions, that is, in a direction to compress the collet and grip the work, and in the reverse direction to free the collet permitting it to expand and release the work. By adjusting the stop ring 23 inwardly or outwardly, the point in the travel of the collet-clamping ring at which the clamping or compressing action begins may be varied to suit slight variations in the diameter of the bar stock held by the collet.

I have herein illustrated and described one physical embodiment of the principle of the invention which in practice has been found to satisfactorily effectuate the stated purpose or object thereof; but I do not limit the invention to the structural details disclosed, but reserve such variations, modifications and mechanical equivalents as fall within the spirit and purview of the claims.

I claim:

1. In a chuck of the type described, the combination of a hollow chuck body, a self-expanding collet mounted in said body, a collet-clamping ring encircling said collet, said collet and clamping ring being formed with tapered engaging surfaces, a group of levers pivoted in said chuck body each having an arm articulated with said clamping ring, and a sliding member on said chuck body adapted to rock said levers in both directions.

2. In a chuck of the type described, the combination of a hollow radially slotted chuck body, a self-expanding collet mounted in said body, a collet-clamping ring encircling said collet, said collet and clamping ring being formed with tapered engaging surfaces, a group of levers pivoted in the slots of said chuck body, each of said levers having an inwardly extending arm articulated with said clamping ring and a pair of outwardly directed arms projecting through the periphery of said chuck body, a ring slidably mounted on said chuck body adapted when moved in one direction to engage and rock one of said outwardly directed arms, and when moved in the opposite direction to engage and rock the other of said outwardly directed arms, and means for actuating said last named ring.

3. In a chuck of the type described, the combination of a hollow chuck body, a self-expanding collet splined in said chuck body, a collet-clamping ring encircling said collet, said collet and clamping ring being formed with tapered engaging surfaces, a collet stop ring adjustably mounted in the outer end of said chuck body, and manually operable means for moving said clamping ring in both directions lengthwise of said collet.

4. In a chuck of the type described, the combination of a hollow chuck body, a self-expanding collet mounted in said body, a collet-clamping ring encircling said collet, said collet and clamping ring being formed with tapered engaging surfaces, a group of levers pivoted in said chuck body each having an arm articulated with said clamping ring, a slider on said chuck body adapted to rock said levers in both directions, a chuck housing, and a lever pivoted in said housing and operatively engaged with said slider for moving the latter in both directions.

5. In a chuck of the type described, the combination of a hollow chuck body, a self-expanding collet mounted in said body, a collet-clamping ring encircling said collet, said collet and clamping ring being formed with tapered engaging surfaces, a group of levers pivoted in said chuck body each having an inwardly directed arm articulated with said clamping ring and a pair of outwardly directed arms projecting through the periphery of said chuck body, a ring slidably mounted on said chuck body adapted when moved in one direction to engage and rock one of said outwardly directed arms, and when moved in the opposite direction to engage and rock the other of said outwardly directed arms, a chuck housing, a lever pivoted in said housing operatively engaged with said last-named ring, and manually operable means mounted in said housing connected to and actuating said last-named lever in both directions.

6. In a chuck of the type described, the combination of a hollow chuck body, a self-expanding collet mounted in said body, a collet-clamping ring encircling said collet, said collet and clamping ring being formed with tapered engaging surfaces, and a member mounted on said body and articulated with said clamping ring serving, when moved in one direction, to cause said clamping ring to compress said collet, and when moved in the reverse direction to cause said clamping ring to release said collet.

7. In a chuck of the type described, the combination of a hollow chuck body, a self-expanding collet mounted in said body, a collet clamping ring encircling said collet, said collet and clamping ring being formed with tapered engaging surfaces, and a group of levers pivoted in said body each having an arm articulated with said clamping ring, said levers serving, when rocked in one direction to cause said clamping ring to compress said collet, and when moved in the reverse direction to cause said clamping ring to release said collet.

GEORGE M. CLASS.